US012034907B2

United States Patent
Ollila

(10) Patent No.: US 12,034,907 B2
(45) Date of Patent: Jul. 9, 2024

(54) SELECTIVE EXTENDED DEPTH-OF-FIELD CORRECTION

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 201 days.

(21) Appl. No.: 17/886,715

(22) Filed: Aug. 12, 2022

(65) Prior Publication Data

US 2024/0056564 A1 Feb. 15, 2024

(51) Int. Cl.
*H04N 13/383* (2018.01)
*G06T 5/50* (2006.01)
*G06T 5/70* (2024.01)
*G06T 5/73* (2024.01)
*G06T 7/55* (2017.01)

(52) U.S. Cl.
CPC ............ *H04N 13/383* (2018.05); *G06T 5/50* (2013.01); *G06T 5/70* (2024.01); *G06T 5/73* (2024.01); *G06T 7/55* (2017.01)

(58) Field of Classification Search
CPC .......... H04N 13/383; G06T 5/50; G06T 5/70; G06T 5/73; G06T 7/55
USPC ......................................................... 348/51
See application file for complete search history.

(56) References Cited

U.S. PATENT DOCUMENTS

| | | | |
|---|---|---|---|
| 11,056,030 | B1 | 7/2021 | Melakari et al. |
| 2013/0088489 | A1* | 4/2013 | Schmeitz ................ G06T 5/20 345/419 |
| 2019/0158803 | A1* | 5/2019 | Mizukura ................ G06T 5/50 |
| 2019/0158813 | A1* | 5/2019 | Rowell ................ H04N 13/111 |
| 2021/0373327 | A1* | 12/2021 | Vlaskamp .......... G02B 27/0172 |

OTHER PUBLICATIONS

Buemi et al, "Adaptive Sharpening with Overshoot Control", Image Analysis and Processing (ICIAP), Lecture Notes In Computer Science, pp. 863-872, 2009.
Chen et al, "Blind Image Deblurring with Local Maximum Gradient Prior", 2019 IEEE/CVF Conference on Computer Vision and Pattern Recognition (CVPR), pp. 1742-1750, 2019.
Huang et al, "Efficient Contrast Enhancement using Adaptive Gamma Correction with Weighting Distribution" IEEE Transactions on Image Processing, vol. 22, Issue 3, Oct. 2012, pp. 1032-1041.
Pan et al, "Blind Image Deblurring Using Dark Channel Prior" 2016 IEEE Conference on Computer Vision and Pattern Recognition (CVPR), pp. 1628-1636, 2016.

(Continued)

*Primary Examiner* — Tung T Vo
(74) *Attorney, Agent, or Firm* — Ziegler IP Law Group LLC.

(57) ABSTRACT

An imaging system including a first camera and a second camera corresponding to a first eye and a second eye of a user, respectively; and at least one processor. The at least one processor is configured to control the first camera and the second camera to capture a sequence of first images and a sequence of second images of a real-world environment, respectively; and apply a first extended depth-of-field correction to one of a given first image and a given second image, whilst applying at least one of: defocus blur correction, image sharpening, contrast enhancement, edge enhancement to another of the given first image and the given second image.

28 Claims, 2 Drawing Sheets

(56) References Cited

OTHER PUBLICATIONS

Patel et al, "A Survey on Different Image Deblurring Techniques", International Journal of Computer Applications, vol. 16, Issue 13, Apr. 2015.
Tan et al, CodedStereo: Learned Phases Masks for Large Depth-of-field Stereo: 2021 IEEE/CVF Conference on Computer Vision and Pattern Recognition (CVPR), pp. 7170-7179, Nov. 2021.
Tan et al, "EDoF-ToF: extended depth of field time-of-flight imaging" Optics Express, vol. 29, Issue 23, pp. 38540-38556, Nov. 2021.
Tao et al, "Adaptive and Integrated Neighborhood-Dependent Approach for Non-linear Enhancement of Color Images", Journal of Electronic Imaging, vol. 14, No. 4, Oct. 2005.
Tao et al, "Scale-recurrent Network for Deep Image Deblurring", 2018 IEEE/CVF Conference on Computer Vision and Pattern Recognition, pp. 8174-8182.

\* cited by examiner

SELECTIVE EXTENDED DEPTH-OF-FIELD CORRECTION

TECHNICAL FIELD

The present disclosure relates to imaging systems incorporating selective extended depth-of-field correction. The present disclosure also relates to methods incorporating selective extended depth-of-field correction.

BACKGROUND

Image processing is a very useful technology that is evolving quickly. Image processing has observed a rising demand from various industries, such as, healthcare, military, robotics, agriculture, food, entertainment, and the like. Furthermore, said technology has become crucial in many applications, such as, but not limited to, pattern recognition, remote sensing, transmission and coding, robot vision, colour processing, image sharpening and restoration, feature extraction, forecasting, and the like. Specifically, image enhancement is important since it is used in virtually all the applications of image processing.

Image processing is used to perform certain operations on the images captured by a camera to ensure that the image conveys useful and rich visual information. However, typically, the images are extremely susceptible to various types of visual artifacts such as blur, noise, or similar therein; such images are generally not utilized directly, as they also adversely affect image aesthetics, which is undesirable when creating specialised environments, such as immersive extended-reality (XR) environments.

Existing techniques and equipment are inadequate in terms of properly resolving the visual artifacts in the images, such as out-of-focus blurring, or their extents present in the image. Firstly, special algorithms using learning-based methods are used for image corrections. Such learning-based methods learn from examples of corrections made to previously-captured images. For example, nowadays, depth of field can be extended using conventional special algorithms, without using special lenses, utilizing neural networks, or using additional phase masks or amplitude masks. However, extending the depth of field in such a way makes computational processing heavier. This heavy computational processing also adversely impacts contrast of the image. Secondly, no clarity is obtained regarding an optical depth of an area where a human gaze is focused, wherein the area may comprise multiple objects on different optical depths along a same line of sight. This lack of clarity is even so in case of employing a perfect gaze tracking system. Furthermore, a virtual video see-through (VST) system may have several simultaneous users; a lack of clarity of depth of field where the human gaze is focused results in reducing immersiveness of such a system. Thirdly, traditional implementations of certain algorithms that aim to resolve visual artifacts, such as blurring outside of depth-of-field, apply various constraints to model characteristics of such artifacts. Therefore, implementations of said algorithms involve heuristic parameter-tuning and expensive computation. In a stereo imaging system, such implementations are economically not feasible to implement for images corresponding to both eyes.

Therefore, in light of the foregoing discussion, there exists a need to overcome the aforementioned drawbacks associated with existing equipment and techniques for correcting images.

SUMMARY

The present disclosure seeks to provide an imaging system incorporating selective extended depth-of-field correction. The present disclosure also seeks to provide a method incorporating selective extended depth-of-field correction. An aim of the present disclosure is to provide a solution that overcomes at least partially the problems encountered in prior art.

In a first aspect, the present disclosure provides an imaging system comprising:
 a first camera and a second camera corresponding to a first eye and a second eye of a user, respectively; and
 at least one processor configured to:
  control the first camera and the second camera to capture a sequence of first images and a sequence of second images of a real-world environment, respectively; and
  apply a first extended depth-of-field correction to one of a given first image and a given second image, whilst applying at least one of: defocus blur correction, image sharpening, contrast enhancement, edge enhancement to another of the given first image and the given second image.

In a second aspect, the present disclosure provides a method comprising:
 controlling a first camera and a second camera to capture a sequence of first images and a sequence of second images of a real-world environment, respectively, wherein the first camera and the second camera correspond to a first eye and a second eye of a user, respectively; and
 applying a first extended depth-of-field correction to one of a given first image and a given second image, whilst applying at least one of: defocus blur correction, image sharpening, contrast enhancement, edge enhancement to another of the given first image and the given second image.

Embodiments of the present disclosure substantially eliminate or at least partially address the aforementioned problems in the prior art, and enable reliable, resource-efficient correction of images by incorporating extended depth-of-field correction selectively, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
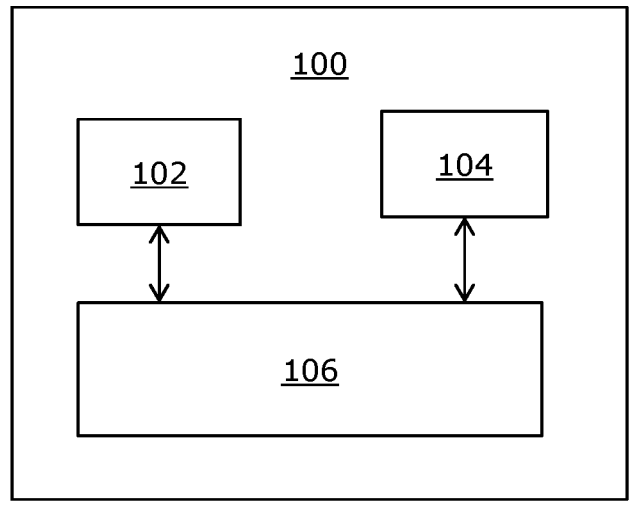
FIGS. 1A and 1B illustrate block diagrams of architectures of an imaging system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:
- a first camera and a second camera corresponding to a first eye and a second eye of a user, respectively; and
- at least one processor configured to:
  - control the first camera and the second camera to capture a sequence of first images and a sequence of second images of a real-world environment, respectively; and
  - apply a first extended depth-of-field correction to one of a given first image and a given second image, whilst applying at least one of: defocus blur correction, image sharpening, contrast enhancement, edge enhancement to another of the given first image and the given second image.

In a second aspect, the present disclosure provides a method comprising:
- controlling a first camera and a second camera to capture a sequence of first images and a sequence of second images of a real-world environment, respectively, wherein the first camera and the second camera correspond to a first eye and a second eye of a user, respectively; and
- applying a first extended depth-of-field correction to one of a given first image and a given second image, whilst applying at least one of: defocus blur correction, image sharpening, contrast enhancement, edge enhancement to another of the given first image and the given second image.

The present disclosure provides the aforementioned imaging system and the aforementioned method incorporating different image corrections for different eyes. Herein, the first extended depth-of-field (EDOF) correction and the at least one of: defocus blur correction, image sharpening, contrast enhancement, edge enhancement are applied in the aforesaid manner to a sequence of stereo image pairs (namely, the sequence of first images and the sequence of second images). The imaging system enables in minimizing processing resource utilization and processing time of the at least one processor, without compromising on the user's viewing experience, because the first EDOF correction (which is generally a computationally intensive operation) is only applied to a single image in a stereo image pair (namely, to the one of the given first image and the given second image). For the another of the given first image and the given second image, switching can be performed between various restorations (namely, the at least one of: defocus blur correction, image sharpening, contrast enhancement, edge enhancement) without affecting the contrast of the another of the given first image and the given second image. The method is simple, robust, fast, reliable and can be implemented with ease.

The present disclosure elaborates on application of different neural networks customised corresponding to different focussing distance ranges. Herein, the different focussing ranges may be shorter ranges as compared to focussing distance ranges corresponding to the conventional neural networks (which work on an entire range of focussing distances from 10 cm to infinity). Therefore, the technical benefit is that the different neural networks are faster, easier to train, and more accurate than the conventional neural networks. The different neural networks are easier to implement, and are cost-feasible. In some embodiments described later, the imaging system also provides clarity regarding the optical depth of an area where a human gaze is focused, even when simultaneous users are using said system.

Furthermore, although only one image (out of the given first image and the given second image) is selected for applying the first EDOF correction, irrespective of whether or not said image has blurring outside of depth-of-field, and a remaining image is selected for applying the at least one of: defocus blur correction, image sharpening, contrast enhancement, edge enhancement, an overall visual quality achieved by a combined view of the given first image and the given second image (upon such correction) is very high. Notably, human binocular vision fuses the given first image and the given second image into one, such that human brain picks up a better contrasted image from amongst the given first image and the given second image. In a case where there is blurring outside of depth-of-field in both the given first image and the given second image, the one of the given first image and the given second image (to which the first EDOF correction is applied) has a high visual quality, while the another of the given first image and the given second image does not have such a high visual quality. As a result, the user perceives a high visual quality in the given first image and the given second image, when displayed to her/him, even when only one of the images has the high visual quality. In another case where there is no blurring outside of depth-of-field in the given first image and the given second image, the one of the given first image and the given second image (to which the first EDOF correction is applied) has no change in visual quality as compared to the another of the given first image and the given second image. However, the user perceives an acceptably high visual quality in the given first image and the given second image, when displayed to her/him, even when the one of the given first image and the given second image has no change in visual quality as compared to the another of the given first image and the given second image. In this manner, the images displayed by a display apparatus are perceived by the user to have high visual quality overall, whilst reducing a need to apply heavy image processing (namely, the first EDOF correction) to the another of the given first image and the given second image. Moreover, it will be appreciated that the aforesaid images are corrected by the at least one processor in real time or near-real time (i.e., without any latency/delay).

Notably, the at least one processor controls an overall operation of the imaging system. The at least one processor is communicably coupled to at least the first camera and the second camera wirelessly and/or in a wired manner.

Throughout the present disclosure, the term "camera" refers to an equipment that is operable to detect and process light signals received from the real-world environment, so as to capture image(s) of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera. Throughout the present disclosure, the term "image" refers to a visual representation of the real-world environment, which encompasses not only colour information represented in the image, but also other attributes associated with the image (for example, such as depth information, transparency information, luminance information, brightness information, and the like). It will be appreciated that the given first image and the given second image are captured simultaneously (namely, at a same time), via the first camera and the second camera, respectively. The given first image is captured with respect to a perspective of the first eye of the user, while the given second image is captured with respect to a perspective of the second eye of the user. The given first image and the given second image constitute a stereo image pair for the user's eyes. The stereo image pair represents a given scene of the real-world environment in a 3D realistic manner.

Throughout the present disclosure, the term "display apparatus" refers to a specialized equipment that is capable of displaying images. These images are to be presented to the user of the display apparatus. Optionally, the display apparatus is implemented as a head-mounted display (HMD) device. The term "head-mounted display" refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. Upon correction, the given first image and the given second image are utilized for generating the visual scene of the XR environment. The term "extended-reality" encompasses virtual reality (VR), augmented reality (AR), mixed reality (MR), and the like.

Optionally, the given camera is arranged on the display apparatus worn by the user on his/her head, wherein the given camera is aligned to capture a given image from a perspective of a given eye of the user. Optionally, in this regard, the first camera and the second camera are arranged to face the real-world environment in a manner that a distance between them is equal to an interpupillary distance (IPD) between the first eye and the second eye of the user.

In some implementations, the imaging system is integrated with the display apparatus. In such implementations, all components of the imaging system are physically coupled to the display apparatus (for example, attached via mechanical and/or electrical connections to components of the display apparatus). Optionally, the at least one processor of the imaging system serves as the at least one processor of the display apparatus. Alternatively, optionally, the at least one processor of the imaging system is communicably coupled to the at least one processor of the display apparatus.

In other implementations, at least one component (such as the first camera and the second camera) of the imaging system is implemented on a remote device that is separate from the display apparatus. In such implementations, the at least one processor of the imaging system and the at least one processor of the display apparatus are communicably coupled, wirelessly and/or in a wired manner. Examples of the remote device include, but are not limited to, a computer, a teleport device, a drone, a vehicle, and a robot.

It will be appreciated that the term "extended depth-of-field correction" refers to a corrective image processing operation that emulates a visual effect of extension of the depth-of-field over which the objects of the real-world environment appear to be in-focus (i.e., well focused) in the image. Herein, the term "depth-of-field" refers to a distance between a nearest point and a farthest point in the real-world environment that are acceptably sharply focused in the image captured by the camera. The nearest point lies in front of a focus point (for example, such as an object) on which the lens of the camera is actually focussed, while the farthest point lies behind the focus point. The nearest point and the farthest point may be an equal distance or at an unequal distance from the focus point. The depth-of-field may be determined by a focal length of the lens of the camera, a distance to the object, an aperture, or similar. The extension of the depth-of-field does not sacrifice resolution or brightness, thereby clearly capturing the objects in the real-world environment without a need to adjust the focus of the camera and an angle between the objects and the camera. The EDOF correction enables deblurring of objects that lie outside of a focal region of the lens of the camera (i.e., outside the depth-of-field of the lens of the camera) to produce an extended-in-focus view of the real-world environment. The EDOF correction may be applied to captured in-focus images of at least one of: multiple objects present in at least a foreground and/or a background of a given object in the real-world environment, oblique objects, objects at different heights, objects at different depths.

Furthermore, the term "defocus blur" refers to a visual anomaly representing a loss of sharpness of object(s) of the real-world environment in a given image upon capturing of the given image. In other words, the object(s) represented in a given region of the given image appear(s) to be out of focus (namely, blurred), due to the defocus blur. The defocus blur may occur due to improper focussing of a camera, or due to a defective/poor-quality optical element (such as a lens) of the camera. The aforesaid terms are well-known in the art.

It will be appreciated that visual anomalies such as defocus blur, blur in the images, poor contrast, poor acutance, and the like, could occur in one or both of the first camera and the second camera. Optionally, in this regard, when one of the first camera and the second camera is not known to cause such visual anomalies during image capturing, while another of the first camera and the second camera is known to cause such visual anomalies repeatedly during image capturing, the at least one processor is configured to select a given image captured by the another of the first camera and the second camera as the another of the given first image and the given second image, for applying corrections corresponding to such visual anomalies (namely, the at least one of: defocus blur correction, image sharpening, contrast enhancement, edge enhancement).

Pursuant to embodiments of the present disclosure, different types of corrections (namely, the first EDOF correction and the at least one of: defocus blur correction, image sharpening, contrast enhancement, edge enhancement) could be applied easily and repeatedly for the sequence of first images and the sequence of second images without requiring fulfilment of any criterion or threshold. It is to be noted here that some existing techniques for correcting images employ a combination of noise correction and EDOF correction. However, such a combination is not effective and reliable due to binocular rivalry, as even after fusion of images upon correction, the human vision system is still able to see peripheral noise in a combined view of such images.

Optionally, the EDOF correction is applied by utilising at least one of: defocus map estimation, blind image deblurring deconvolution, non-blind image deblurring deconvolution. The defocus map estimation may utilize a defocussed (i.e., blurred) image to detect edges around said image, estimate an amount of blur around the edges, and interpolate the estimated amount of blur to determine the amount of blur in homogenous regions of the defocussed image. The blind image deblurring deconvolution may utilize a blur kernel that may be estimated based on a regularisation. The non-blind image deblurring deconvolution utilizes a point spread function (PSF) for image restoration. Thus, the EDOF correction may employ at least one of: a restoration filter based on deconvolving with a wiener filter, a constrained least-squares image restoration filter, a Lucy-Richardson deconvolution algorithm, an artificial neural network (ANN)-based image restoration algorithm. These techniques are well-known in the art.

Optionally, the EDOF correction may be performed by employing a deblurring neural network implemented using deep learning techniques, to correct (i.e., deblur) the objects of the real-world environment outside of the focal region of the lens of the camera. In such a case, the aperture of the camera is large and thus allows more light to enter the lens of the camera, as compared to cameras with smaller apertures. Herein, the neural network is utilized to extend the depth-of-field and increase light throughput as compared to conventional neural networks. Hence, signal-to-noise ratio is improved, thereby enabling a reduced consumption of power and overall improvement in accuracy of measurement. One such deblurring neural network using deep learning techniques is described, for example, in "*EDoF-ToF: extended depth of field time-of-flight imaging*" by Jasper Tan, Vivek Boominathan et al., published in Optics Express, Vol. 29, Issue 23, pp. 38540-38556, November 2021, which has been incorporated herein by reference.

Optionally, a camera lens of a given camera that captured the one of the given first image and the given second image comprises a phase mask or an amplitude mask. The phase mask and the amplitude mask are physical masks and serve as optical elements of the given camera. The phase mask or the amplitude mask is integrated with the camera lens or is detachably attached to the camera lens. The camera lens is arranged on an optical path between the real-world environment and an image sensor of the given camera. Beneficially, the phase mask provides a high signal to noise ratio by allowing most of incident light to pass through. Moreover, the phase mask may create at least one point spread function that may be dependent on the optical depths of the objects. A technical benefit of utilising the phase mask is that a sharp image texture and stereo correspondence may be recovered from the one of the given first image and the given second image over the extended depth-of-field. Another technical benefit of using the phase mask is that there is more controlled correction of the out-of-focus blur in the one of the given first image and the given second image. On the other hand, the amplitude mask modulates an amplitude of incident light incident upon the image sensor of the camera by at least one of: passing, blocking, attenuating, photons of the incident light. Herein, a point spread function of the amplitude mask may be a shadow. A technical benefit of utilising the amplitude mask is that it extends the depth of field of the imaging system. Furthermore, amplitude masks are easier to manufacture.

Optionally, the camera lens of each of the first camera and the second camera comprises a phase mask, wherein the phase mask is introduced in the aperture of a given camera (namely, the first camera and the second camera), and wherein the phase mask is configured to at least one of: produce a focal blur that is dependent on optical depth, increase a size of the aperture of the given camera. The production of the focal blur is implemented using at least one algorithm that is used to retain a resolution and quality of a given image (namely, the first image and the second image). The increased size of the aperture of the given camera increases a light throughput of the given camera, without compromising the depth-of-field. Hence, the phase mask improves signal-to-noise ratio (SNR) of the given image and the light throughput, and creates a point spread function that is dependent on disparity, thereby obtaining a sharp image perceivable by the user in the extended depth-of-field. One such way of introducing the phase mask is described, for example, in "*CodedStereo: Learned Phases Masks for Large Depth-of-field Stereo*" by Shiyu Tan, Yicheng Wu et al., published in 2021 IEEE/CVF Conference on Computer Vision and Pattern Recognition (CVPR), pp. 7170-7179, November 2021, which has been incorporated herein by reference.

Moreover, optionally, the EDOF correction employs a scale-recurrent network to increase an apparent sharpness of the given image, wherein said network comprises a plurality of recurrent modules with a plurality of hidden states, and wherein said network employs at least one convolutional layer to connect the plurality of hidden states to consecutive scales. Herein, a given convolutional layer uses a convolutional kernel, for example, equal to 5×5 for the given convolutional layer. This is implemented by sharing weights of the scale-recurrent network across scales. The sharing of weights of the scale-recurrent network across scales causes a reduction in number of training parameters as compared to conventional networks, thereby enabling augmentation of data regarding scales in said network to increase the apparent sharpness. One such scale-recurrent network is described, for example, in "*Scale-recurrent Network for Deep Image Deblurring*" by Xin Tao, Hongyun Gao et al., published in 2018 IEEE/CVF Conference on Computer Vision and Pattern Recognition, pp. 8174-8182, 2018, which has been incorporated herein by reference.

Optionally, the defocus blur correction is applied by utilising at least one of: blind image deblurring deconvolution, non-blind image deblurring deconvolution. The blind image deblurring deconvolution may utilize a blurred image for deblurring and said deconvolution can be derived using an unconstrained method and/or a constrained method. Thus, the defocus blur correction using blind image deblurring deconvolution may employ constrained methods with some regularisations or image priors, such as at least one of:

an algorithm for linear approximation of a minimization operator to compute at least one dark channel of the defocused image, a linear operator to compute local maximum gradient, along with an optimization algorithm used for optimizing the local maximum gradient, an algorithm for recovering sharp image from a blurred image when a blur kernel is unknown, a restoration filter based on deconvolving with a Wiener filter.

One such algorithm for linear approximation is described, for example, in "*Blind Image Deblurring Using Dark Channel Prior*" by Jinshan Pan, Deqing Sun et al., published in 2016 IEEE Conference on Computer Vision and Pattern Recognition (CVPR), pp. 1628-1636, 2016, which has been incorporated herein by reference. One such linear operator is described, for example, in "*Blind Image Deblurring with Local Maximum Gradient Prior*", by Liang Chen et al., published in 2019 IEEE/CVF Conference on Computer Vision and Pattern Recognition (CVPR), pp. 1742-1750, 2019, which has been incorporated herein by reference. An example of defocus blur correction using blind image deblurring deconvolution by employing an unconstrained method may be inverse filtering.

The non-blind image deblurring deconvolution use the defocused image and at least one known PSF for deblurring. The at least one PSF can be estimated from a pair of a blurred image and a sharp image. The estimation can be procured using at least one specialised method. Examples of the at least one specialised method may include, but is not limited to, a method for automatically estimating spatially varying PSFs which are distributed over the pair of the blurred image and the sharp image, a method for estimating non-parametric spatially varying PSFs at sub-pixel resolution from a single blurred image. Thus, the defocus blur correction using non-blind image deblurring deconvolution may employ at least one of: a Lucy-Richardson deconvolution algorithm, Van Cittert algorithm, Landweber algorithm, a Poisson maximum a posteriori (MAP) estimation algorithm, a restoration filter based on deconvolving with a Wiener filter, a constrained least-squares image restoration filter. Herein, the Lucy-Richardson deconvolution algorithm may be utilized for recovering a defocused image by a known PSF. It will be appreciated that the Lucy-Richardson deconvolution algorithm can also be used for blind image deblurring deconvolution. The aforementioned algorithms and/or filters employed for non-blind image deblurring deconvolution can be utilised in an iterative manner. Few such techniques are described, for example, in "*A Survey on Different Image Deblurring Techniques*", by Amit Patel et al., published in International Journal of Computer Applications, Vol. 16, Issue 13, April 2015, which have been incorporated herein by reference.

The term "image sharpening" refers to an image processing technique for increasing an apparent sharpness of (a visual content represented in) a given image. Optionally, when applying the image sharpening to the given image, the at least one processor is configured to employ at least one image sharpening technique. The at least one image sharpening technique may, for example, be an unsharp masking (UM) technique, a wavelet transform-based image sharpening technique, or similar. Optionally, the image sharpening employs a Laplacian filter. Moreover, various ringing control techniques may also be applied along with the image sharpening for reducing noise amplification in the given image. Also, various edge-preserving filters (such as a bilateral filter, a guided filter, or similar) may be used in a similar way as a Gaussian blur filter in the UM technique. The UM technique is described, for example, in "*Adaptive Sharpening with Overshoot Control*" by Antonio Buemi et al., published in Image Analysis and Processing (ICIAP), Lecture Notes in Computer Science, pp. 863-872, 2009, which has been incorporated herein by reference.

The term "contrast enhancement" refers to an image processing technique for adjusting a relative brightness and darkness of object(s) in a visual scene represented by a given image, in order to improve visibility of such object(s). Optionally, when applying the contrast enhancement to the given image, the at least one processor is configured to employ at least one contrast enhancement technique. The at least one contrast enhancement technique may, for example, be a histogram equalization technique, a gamma correction technique, a histogram stretching technique, a histogram shrinking technique, a tone-mapping technique, a high dynamic range (HDR) tone-mapping technique, or similar. Few such techniques are described, for example, in "*Adaptive and Integrated Neighborhood-Dependent Approach for Nonlinear Enhancement of Color Images*" by Li Tao and Vijayan K. Asari, published in Journal of Electronic Imaging, Vol. 14, No. 4, October 2005, and in "*Efficient Contrast Enhancement using Adaptive Gamma Correction with Weighting Distribution*" by Shih-Chia Huang, Fan-Chieh Cheng, and Yi-Sheng Chiu, published in IEEE Transactions on Image Processing, Vol. 22, Issue 3, pp. 1032-1041, October 2012, which have been incorporated herein by reference. In an example implementation of applying the contrast enhancement to the given image, a different exposure time could be used (as compared to an exposure time used for capturing the one of the given first image and the given second image). As an example, a shorter exposure time could be used as compared to an exposure time used for capturing the one of the given first image and the given second image, to avoid over exposure of bright areas in the another of the given first image and the given second image.

The term "edge enhancement" refers to an image processing technique for enhancing an edge contrast of features represented in a given image in order to improve an acutance of the given image. Optionally, when applying the edge enhancement to the given image, the at least one processor is configured to employ at least one edge enhancement technique. The at least one edge enhancement technique may, for example, be a linear edge enhancement technique, a non-linear edge enhancement technique, or similar. The edge enhancement may also facilitate in attenuation of noise in a gaze-contingent region of the given image, and thus a high visual quality is achieved for such a region.

It will be appreciated that the at least one edge enhancement technique targets to modify edges in the given image utilizing various edge detection filters and their directional variants. A modification in such a technique may include, for example, ringing modification, an edge width by embossing, techniques that only impact contrast on edges, or similar. In an example, an emboss filter (namely, a directional difference filter) may enhance the edges in a direction of selected convolution mask(s). When the emboss filter is applied, a filter matrix is in convolution calculation with a same square area as that on the (original) given image.

It will also be appreciated that all the aforementioned operations (namely, the first EDOF correction, the defocus blur correction, the image sharpening, the contrast enhancement, and the edge enhancement) could be divided into two categories, wherein operation(s) of a first category may be applied (by the at least one processor) to a given image, whereas operation(s) of a second category may be applied (by the at least one processor) to a remaining image. In this regard, the first category relates to a macro level error correction of an image, and thus comprises heavy processing operations, for example, such as the first EDOF correction for correcting out-of-focus due to a depth-of-field of a camera lens. These operations may be applied using a large blur kernel, for example, lying in a range from a 20×20 grid of pixels to a 150×150 grid of pixels.

Moreover, the second category relates to a micro level error correction of an image (i.e., a fine tuning of the image), and thus comprises light processing operations, for example, such as a defocus blur correction for correcting defocus blur due to bad optics quality, the image sharpening, the contrast enhancement, the edge enhancement, and optionally a super-resolution technique. These operations could be applied using a small blur kernel, for example, lying in a range from a 5×5 grid of pixels to a 15×15 grid of pixels.

Furthermore, according to an embodiment, the at least one processor is configured to:
  obtain information indicative of a dominant eye of the user or determine the dominant eye from amongst the first eye and the second eye;
  apply the first EDOF correction to the one of the given first image and the given second image by utilising a first neural network that corrects first point spread functions at a focussing distance range of 10 centimetres to M, the first point spread functions correspond to a given camera that captured the one of the given first image and the given second image, M lying in a range of 30 centimetres to 100 centimetres; and
  apply a second EDOF correction to the another of the given first image and the given second image by utilising a second neural network that corrects second point spread functions at a focussing distance range of N to infinity, N lying in a range of 30 centimetres to 100 centimetres, the second point spread functions correspond to another given camera that captured the another of the given first image and the given second image, wherein the another given camera corresponds to the dominant eye of the user.

An eye of the user whose visual input is preferred to that of another eye of the user is referred to as a "dominant eye" of the user. In some cases, an ocular dominance of the user (i.e., a tendency of the user's eyes to prefer visual input from one eye to another eye of the user) may be a normal visual condition of proper functioning of the user's eyes, wherein both eyes of the user have similar visual acuity and one eye is simply preferred over the other eye. In other cases, the ocular dominance of the user may be indicative of an underlying anomalous medical condition, which the user suffers from. Such a medical condition may be, for example, constant strabismus or intermittent strabismus. The dominant eye may be either the first eye of the user or the second eye of the user.

In some implementations, the information indicative of the dominant eye is pre-determined and pre-stored for the user, at a data repository that is communicably coupled to the at least one processor. In such a case, the at least one processor is configured to obtain the information indicative of the dominant eye from the data repository. Such a data repository may be implemented as a memory of the imaging system, a removable memory, a cloud-based database, or similar. Optionally, the information indicative of the dominant eye is pre-determined by an ophthalmologist. In a such case, the ophthalmologist conducts at least one eye test for the user's eyes to generate the information indicative of the dominant eye, wherein said information comprises eye-testing data. Optionally, the information indicative of the dominant eye is communicated from a device associated with the ophthalmologist or the user, to the data repository, wherein the device associated with the ophthalmologist or the user is communicably coupled to the data repository. Examples of such a device include, but are not limited to, a computer, a laptop, a smartphone, and a tablet. It will be appreciated that the data repository is optionally used to store information indicative of dominant eye for a plurality of users. The at least one processor could also obtain the information pertaining to the dominant eye directly from the user, prior to, or at a start of a given session of using the imaging system (or the display apparatus).

In other implementations, the at least one processor is configured to determine the dominant eye during an initial calibration of the display apparatus according to the user's eyes. In such a case, gaze-tracking means of the display apparatus is employed to generate gaze-tracking data for the user's eyes during the initial calibration of the display apparatus. Optionally, in this regard, the gaze-tracking means is employed to collect the gaze-tracking data of both eyes of the user, when the user views at least one reference image during the initial calibration. Herein, the term "reference image" refers to an image that is to be used for calibrating the display apparatus according to the user's eyes. Optionally, in this regard, the at least one reference image presents to the user a given visual target at a given location and a given optical depth. The term "visual target" refers to a visible mark (namely, spot) represented within the at least one reference image. Notably, the given visual target is distinctly visible in the at least one reference image. For example, in the at least one reference image, the given visual target may be represented at a central portion, a corner portion, a top portion, a right-side portion, and the like, of a field of view of the user. Since the at least one processor controls displaying of the at least one reference image, the given location and the given optical depth of the given visual target are already known to the at least one processor. In this regard, the at least one processor is configured to determine expected gaze directions of the user's eyes, based on the given location and the given optical depth of the given visual target. Then, the at least one processor compares the expected gaze directions of the user's eyes with determined gaze directions of the user's eyes, to determine which eye of the user acts as the dominant eye (at the given optical depth). In this regard, an eye of the user for which the expected gaze direction is substantially similar to the determined gaze direction is determined to be the dominant eye.

Throughout the present disclosure, the term "point spread functions" (PSFs) refers to responses of the imaging system to any one of: a point source, a point object. The PSFs are a description of at least one point in the real-world environment as represented in the image. Ideally, the PSFs are a three-dimensional diffraction pattern of light emitted from an infinitely small point source, which varies depending on a distance of the camera from said point source (i.e., a focussing distance). However, in practice, the PSFs often appear like a Gaussian function, due to at least one of: diffraction of light, aberration of the lens, image sensing. The PSFs are a measure for the quality of the imaging system, as they reveal how the at least one point is blurred in the image. Herein, integration of the PSFs over entire span of the PSFs is equal to 1, i.e., the PSFs are normalized. The PSFs allow for correction of out-of-focus blur in the image. If there is no out-of-focus blur, the PSFs are centred about zero. The out-of-focus blur causes the PSFs to move away from zero by an amount directly proportional to a shift in a pixel of the given image. Typically, knowing the PSFs of the imaging system is important for restoring sharpness of an original object with deconvolution in the image. The PSFs may be independent of position in a plane of the object. The PSFs vary depending on the wavelength of the light. For example, shorter wavelengths of light (for example, such as blue light of 450 nanometres) result in PSFs that are smaller than PSFs of longer wavelengths of light (for example, such as red light of 650 nanometres). The PSF may further depend on numerical aperture (NA) of the lens (i.e., objective lens) of the camera. In another example, an objective lens having a higher NA gives a smaller PSF when compared to an objective lens having a smaller NA.

Optionally, the first neural network and the second neural network that are utilised to correct the first point spread functions and the second point spread functions, respectively, are convolutional neural networks. Optionally, in this regard, a U-Net architecture of the convolutional neural networks is used to train the PSFs to procure correct PSFs. The U-Net architecture comprises a contracting path and an expansive path. The contracting path is similar to a typical structure of the convolutional neural networks, wherein repeated application of convolution takes place, followed by a rectified linear unit and a max pooling operation. Herein, spatial information and feature information are fetched from the PSFs. Upon passing through the contracting path, the spatial information is reduced whereas the feature information is increased. Subsequently, the expansive path combines the spatial information and the feature information through a series of deconvolution and concatenations with high-resolution features procured from the contracting path. In the present disclosure, two different neural networks are utilised for correcting images corresponding to different eyes instead of utilising a single, large neural network, as is conventionally used. A technical benefit of utilising two different neural networks is that the computational processing is divided between the two different neural networks, thereby reducing time required in processing. The first neural network and the second neural network are optionally complementary to each other. For example, the first neural network may be for a focussing distance range of 10 centimetres (cm) to 80 cm, while the second neural network may be for a focussing distance range of 80 cm to infinity, thereby covering an entire focussing distance range. Alternatively, optionally, the focussing distance ranges of the first neural network and the second neural network may overlap partially. The one of the given first image and the given second image requires application of the first EDOF correction (which is a heavy processing operation) by utilising the first neural network, since said image is to be shown to a non-dominant eye of the user. Typically, human vision picks the non-dominant eye for viewing nearby objects, while picking the dominant eye for viewing far away objects. The another of the given first image and the given second image requires application of the second EDOF correction (which is a lighter processing operation than the first EDOF correction) by utilising the second neural network, since said image is to be shown to the dominant eye of the user. Owing to their different focussing ranges, the second EDOF correction is lighter than the first EDOF correction. The first neural network and the second neural network are used for shorter individual focussing distance ranges as compared to a single conventional neural network conventionally used for a focussing distance range for 10 cm to infinity. Therefore, the first neural network and the second neural network are faster, easier to train, and more accurate than a single convolutional neural network, because of a smaller number of specific images (namely, images for their respective specific focussing distance ranges) required for training them.

As mentioned earlier, the first EDOF correction is applied to nearby objects lying within the focussing distance range of 10 centimetres to M, wherein M lies in the range of 30 centimetres to 100 centimetres. Herein, M may lie in a range from 30, 50, 80, or 90 cm to 50, 80 or 100 cm. The first EDOF correction is applied to the image that is to be shown to the non-dominant eye. On the other hand, the second EDOF correction is applied to faraway objects lying within the focussing distance range of N to infinity, wherein N lies in a range of 30 centimetres to 100 centimetres. Herein, N may lie in a range from 30, 50, 80 or 90 cm to 50, 80 or 100 cm. It is to be noted that even though the ranges of M and N are the same, N need not be equal to M. The second EDOF correction is applied, along with other fine-tuning operations (the at least one of: defocus blur correction, image sharpening, contrast enhancement, edge enhancement), to the image which is to be shown to the dominant eye.

According to another embodiment, the at least one processor is configured to:
  obtain information indicative of a gaze direction of a given eye;
  identify a conical region of interest in a given scene of the real-world environment whose axis is the gaze direction;
  determine, based on a depth map of the given scene, optical depths of two or more objects that are present at least partially in the conical region of interest in the given scene at different optical depths;
  determine different focussing steps that correspond to the different optical depths of the two or more objects;
  select at least two different neural networks corresponding to the different focussing steps, wherein each of the at least two different neural networks correspond to at least one focussing step from amongst the different focussing steps;
  determine a heaviest neural network from amongst the at least two different neural networks, based on at least one of: a comparison of a number of focussing steps to which each of the at least two different neural networks corresponds individually, a comparison of focussing distance ranges associated with respective focussing steps of the at least two different neural networks;
  apply the first EDOF correction to the one of the given first image and the given second image by utilising the heaviest neural network; and
  apply a second EDOF correction to the another of the given first image and the given second image by utilising another neural network from amongst the at least two different neural networks.

Optionally, the at least one processor is configured to obtain, from the gaze-tracking means, the information indicative of the gaze direction. The term "gaze-tracking means" refers to a specialized equipment for detecting and/or following gaze of a given eye of the user. The term "gaze direction" refers to a direction in which the given eye of the user is gazing. The gaze direction may be indicated by a gaze vector in the aforesaid information. The gaze-tracking means could be implemented as contact lenses with sensors, cameras monitoring a position, a size and/or a shape of a pupil of the given eye of the user, and the like. Such gaze-tracking means are well-known in the art.

Throughout the present disclosure, the term "axis" refers to an imaginary line extending between a midpoint of a line segment connecting the first eye and the second eye of the user and a point or a region in the real-world environment at which the gaze of the first eye and the second eye are focused (i.e., intersect or converge). The midpoint of the line segment connecting the first eye and the second eye may serve as an apex (namely, pointed tip) of a cone formed by the conical region of interest. In this way, the axis and the conical region of interest are identified based on the gaze direction. Furthermore, the term "conical region of interest" refers to a 3D viewing cone defined by the gaze directions of the first eye and the second eye, respectively. A given 3D viewing cone may depend on accuracy of the gaze-tracking means as well as a size of a natural human vision cone for an optical depth at which the user is gazing. The conical region of interest is a region of focus of the user's gaze within the given real-world scene. Notably, objects lying within the conical region of interest are gaze-contingent objects. Such objects are focused onto foveas of the user's eyes, and are resolved to a much greater detail as compared to the remaining object(s) present in the real-world scene (i.e., objects lying outside the conical region of interest.)

Optionally, a shape of the conical region of interest depends on the gaze directions of the first eye and the second eye. In an example, when the gaze directions of the first and the second eyes are focused at a centre of the given real-world scene (i.e., at a centre of a collective field of view of the first and the second eyes), the conical region of interest may be in a shape of a right circular cone. When the gaze directions of the first and the second eyes are focused on a point towards a given side of the given real-world scene, the conical region of interest may be in a shape of an oblique cone. The given side may be a left side, a right side, a top side, a bottom side, or any corner side, of the given real-world scene.

Throughout the present disclosure, the term "depth map" refers to a data structure comprising information pertaining to the optical depths of objects (or their portions) present in the given real-world scene of the real-world environment. Optionally, for determining the optical depths of the two or more objects, real-world points of the two or more objects are mapped to their corresponding portions of the depth map and information pertaining to optical depths of such portions are extracted. The depth map provides information pertaining to distances (namely, the optical depths) of surfaces of the objects or their portions, from a given viewpoint and a given viewing direction of the user. Optionally, the depth map is an image comprising a plurality of pixels, wherein a pixel value of each pixel indicates optical depth of its corresponding real point/region within the given scene.

Optionally, the at least one processor is configured to generate the depth map of the given scene of the real-world environment by processing depth-mapping data that is collected by depth-mapping means. In this regard, the imaging system comprises the depth-mapping means. Optionally, in this regard, the at least one processor is configured to employ at least one data processing algorithm to process the depth-mapping data for generating the depth map of the given scene of the real-world environment. The depth-mapping data may be in form of depth images, phase images, visible-light images, or similar. Correspondingly, requisite data processing algorithm(s) is/are employed to process the depth-mapping data.

Optionally, the depth-mapping means is implemented as the first camera and the second camera. In this regard, the given camera is implemented as a visible-light camera or as a combination of a visible-light camera and a depth camera. Alternatively, optionally, the depth-mapping means is implemented as at least one depth camera. It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination.

Alternatively or additionally, optionally, the depth-mapping means is implemented as the at least one processor, wherein the at least one processor is configured to utilise a 3D environment model of the real-world environment to generate the depth map of the given scene of the real-world environment from a perspective of a pose of the given camera. The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a 3D surflet cloud, a 3D grid, or similar. In this regard, the imaging system optionally comprises a pose-tracking means that is employed to detect and/or follow the pose of the given camera in the 3D space of the real-world environment. The pose-tracking means may employ an outside-in tracking technique, an inside-out tracking technique, or a combination of both the aforesaid techniques, for collecting pose-tracking data. Such techniques are well-known in the art. The pose-tracking data may be in form of images, IMU/TIMU values, motion sensor data values, magnetic field strength values, or similar.

As mentioned earlier, the at least one processor is configured to determine the different focussing steps depending on the optical depths of the two or more objects. A total number of focusing steps available for focusing are specific to a camera lens of a given camera. Typically, the number of different focussing steps is higher at smaller optical depths (namely, corresponding to nearby objects), as compared to larger optical depths (namely, corresponding to faraway objects). The number of different focussing steps could also be defined by a circle of confusion, as is known in the art.

As mentioned earlier, the at least one processor selects the at least two different neural networks corresponding to the different focussing steps. Herein, said neural networks are trained using images that are captured using respective ones of the different focussing steps. The at least two neural networks may have been trained earlier (i.e., prior to their selection) over a period of time, thereby leading to their learning of focusing characteristics of their corresponding focussing steps. Some neural networks may correspond to more than one focussing step. Examples of such neural networks include, but are not limited to, a Convolutional Neural Network (CNN), a generative adversarial network (GAN), a Recurrent neural network (RNN), and an autoencoder. The GANs typically work with image data and use Convolutional Neural Networks (CNNs) as generator and discriminator models. The generator and discriminator usually have deep convolutional layers to avoid difficulty in scaling of at least two different neural networks and to increase their capabilities by making them deeper. In an example, the at least two different neural networks may be implemented as a Deep Convolutional Generative Adversarial Network (DCGAN). Other well-known examples of the GANs are Bicycle GAN and CycleGAN. The GANs are widely used nowadays for various deep learning-based applications (for example, such as to synthesize new images from existing images). Other examples of the at least two different neural networks are convolutional autoencoders and variational autoencoders that can be used for manipulating (modifying) images as well as synthesize new images that are based on the content and style of at least two different images. These autoencoders include an encoder part and a decoder part. The at least two different neural networks may be trained by a server in cloud and may be a cloud-based neural network. Such neural networks may be trained using better quality images as ground truth material and relatively lower image quality as training material. Herein, "ground truth material" refers to an ideal expected result. Such result is better as compared to the training material but may not be perfect. When the neural network is trained using the ground truth material and the training material, the neural network infers a function indicative of a difference between the ground truth material and the training material. This function is subsequently utilised by the trained neural network to generate a required correction (for example, such as a given EDOF correction, or similar). A deep learning framework such as a TensorFlow framework, a PyTorch framework, a Keras framework, a Caffe framework, or similar may be applied for training the neural network.

As mentioned above, the at least one processor determines the heaviest neural network from amongst the at least two different neural networks, wherein the term "heaviest" is used in regard to an amount of processing operations performed by the neural network. Typically, higher the number focussing steps to which a neural network corresponds, heavier will be the neural network. This is so because the neural network needs to perform a large amount of processing operations to perform focus correction for a high number of focussing steps. Moreover, a neural network that is used for a focussing distance range covering nearby objects is heavier as compared to a neural network that is used for another focussing distance range covering faraway objects or objects at an intermediate distance. It will be appreciated that the focussing steps in a focussing distance range may have a gap therebetween. In other words, the focussing steps in the focussing distance range need not be continuous.

As an example, a first neural network may correspond to focussing step(s) for a focussing distance range of 10 cm to 30 cm. A second neural network may correspond to focussing step(s) for a focussing distance range of 50 cm to 70 cm. A third neural network may correspond to focussing step(s) for focussing distance ranges of 60 cm to 120 cm. A fourth neural network may correspond to focussing step(s) for a focussing distance range of 10 cm to 50 cm. In such a case, the fourth neural network may be determined as the heaviest neural network. Accordingly, the another neural network could be any one of: the first neural network, the second neural network, the third neural network.

Optionally, the two or more objects comprise at least three objects, and the at least two different neural networks comprise at least three different neural networks, and the at least one processor is configured to apply the second EDOF correction and a third EDOF correction in an alternating manner to a given sequence of images corresponding to the another of the given first image and the given second image, wherein the third EDOF correction is applied by utilising yet another neural network from amongst the at least three different neural networks. By applying the second EDOF correction and the third EDOF correction in an alternating manner, objects lying in a combined focussing distance range (namely, a combination of the focussing distance range of the another neural network and a focussing distance range of the yet another neural network) appear acceptably sharp in the given sequence of images. As a result, the at least three objects appear sharp when the given sequence of images is viewed by the user. An additional technical benefit of applying the second EDOF correction and the third EDOF correction in the alternating manner is that visible patterns of visual anomalies or their corrections are not perceivable by the user.

Optionally, the another neural network and the yet another neural network correspond to consecutive focussing steps. When the focussing steps are not consecutive, an alternating variation in sharpness of objects lying in different focussing distance ranges (of the another neural network and the yet another neural network) in the given sequence of images could be perceivable to the user. Hence, the another neural network and the yet another neural network are selected in such a manner that they correspond to the consecutive focussing steps, so as to ensure a continuity of sharp focusing through the different focussing distance ranges.

Additionally or alternatively, optionally, the two or more objects comprise at least three objects, and the at least two different neural networks comprise at least three different neural networks, and the at least one processor is configured to apply the first EDOF correction and a fourth EDOF correction in an alternating manner to a given sequence of images corresponding to the one of the given first image and the given second image, wherein the fourth EDOF correction is applied by utilising still another neural network from amongst the at least three different neural networks that is heavier than the another neural network. By applying the first EDOF correction and the fourth EDOF correction in an alternating manner, objects lying in a combined focussing distance range (namely, a combination of the focussing distance range of the heaviest neural network and a focussing distance range of the still another neural network) appear acceptably sharp in the given sequence of images. As a result, the at least three objects appear sharp when the given sequence of images is viewed by the user.

Optionally, the heaviest neural network and the still another neural network correspond to consecutive focussing steps. When the focussing steps are not consecutive, an alternating variation in sharpness of objects lying in different focussing distance ranges (of the heaviest neural network and the still another neural network) in the given sequence of images could be perceivable to the user. Hence, the heaviest neural network and the still another neural network are selected in such a manner that they correspond to the consecutive focussing steps, so as to ensure a continuity of sharp focusing through the different focussing distance ranges.

Optionally, the at least one processor is configured to select the another neural network from amongst the at least two different neural networks randomly. In this regard, the another neural network is selected randomly so that the two or more objects are sharply (i.e., clearly) and realistically visible, in a random manner, in combined views of the sequence of first images and the sequence of second images. This facilitates in providing an immersive and realistic viewing experience to the user. A technical benefit of randomly selecting the another neural network from amongst the at least two different neural networks is that an overall visual quality of the combined views is very high, and any visible patterns of visual anomalies or their corrections perceivable to the user are avoided.

According to yet another embodiment, the at least one processor is configured to:
determine, based on a depth map of a given scene of the real-world environment, different optical depths of different objects represented in different parts of the one of the given first image and the given second image;

determine different focussing steps that correspond to the different optical depths of the different objects;

select at least two different neural networks corresponding to the different focussing steps, wherein each of the at least two different neural networks corresponds to at least one focussing step from amongst the different focussing steps; and apply the first EDOF correction to the one of the given first image and the given second image by utilising the at least two different neural networks for respective ones of the different parts of the one of the given first image and the given second image.

By utilising the at least two different neural networks for respective ones of the different parts of the one of the given first image and the given second image, an overall image quality of the one of the given first image and the given second image is improved. In this way, the different parts of the one of the given first image and the given second image that represent the different objects are corrected customisably and effectively using suitable neural networks that are pre-trained corresponding to focussing steps corresponding to the optical depths of the objects represented therein.

As mentioned earlier, when applying a given EDOF correction to a given image, the at least one processor could be configured to utilise a neural network that corrects point spread functions specific to at least one optical element of a given camera. Such a neural network could be trained using at least one of:

images having a specific type of blur,
images having at least one specific focal plane,
in-focus images as ground truth material and corresponding blurred images as training material, along with corresponding depth information.

According to still another embodiment, the at least one processor is configured to:

obtain information indicative of a dominant eye of the user or determine the dominant eye from amongst the first eye and the second eye;

determine an optical depth at which the user is looking; and when the optical depth is greater than a predefined threshold depth and a given camera that captured the one of the given first image and the given second image corresponds to the dominant eye of the user, apply the first EDOF correction to the one of the given first image and the given second image.

Optionally, in this regard, the predefined threshold depth lies in a range of 80 centimetres to 300 centimetres. As an example, the predefined threshold depth may be from 80, 100, 120 or 150 centimetres up to 100, 125, 150, 200, 250 or 300 centimetres. It will be appreciated that when the optical depth is greater than the predefined threshold depth, at least one object (that is represented in the one of the given first image and the given second image) corresponding to the determined optical depth can be considered to be a far object (i.e., considerably distant from the user's eyes). Therefore, the dominant eye is preferred to clearly view the at least one object that is far from the user's eyes (as compared to remaining object(s) in the given scene), as visual input of the dominant eye has higher preference. Thus, the at least one processor applies the first EDOF correction to the one of the given first image and the given second image (that is captured by the given camera that corresponds to the dominant eye of the user), so that the at least one object would be clearly visible to the dominant eye of the user. In this manner, the user experiences sharp gaze-contingency and considerable realism upon viewing the (corrected) images.

Optionally, the at least one processor is configured to:

determine an optical depth at which the user is looking; and when the optical depth is not greater than the predefined threshold depth, apply the first EDOF correction to any one of the given first image and the given second image randomly.

In this regard, the at least one processor randomly applies the first EDOF correction to any one of the given first image and the given second image so that both gaze-contingent objects and non-gaze contingent objects randomly appear sharp (i.e., well-focused) in sequences of first images and second images. In this case the gaze-contingent objects are nearby objects. This random manner of applying the first EDOF correction facilitates in providing an immersive and realistic viewing experience to the user. Thus, when one of the given first image and the given second image would be corrected for the out-of-focus in the extended depth-of-field as described hereinabove, an overall number of visual artifacts present in these images collectively would be randomly reduced upon correction (so that such correction is imperceptible to the user). As a result, an overall visual quality of the combined view of the aforesaid images is high, since human binocular vision fuses the given first image and the given second image into one.

Alternatively, optionally, the at least one processor is configured to:

determine an optical depth at which the user is looking; and when the optical depth is not greater than the predefined threshold depth, apply the first EDOF correction to the sequence of first images.

In this regard, the at least one processor applies the first EDOF correction to a sequence of images corresponding to one particular eye of the user, i.e., to the sequence of first images when the optical depth is not greater than the predefined threshold depth. The technical benefit of applying the first EDOF correction in this manner is that since only the sequence of first images would be corrected for the out-of-focus in the extended depth-of-field, the user's brain may get used to (namely, habituated to) perceiving the sequence of first images (upon correction) in the combined view with a high visual quality. Moreover, upon correction of both the given first image and the given second image, an overall visual quality of the combined view would also be high, as an overall number of visual artifacts present in these images would be reduced upon correction and any perceivable (i.e., noticeable) disturbance or pattern due to the visual artifact in the combined view is avoided. This also simplifies processing requirements for the at least one processor as the first EDOF correction is now required to be applied only to the sequence of first images.

Yet alternative, optionally, the at least one processor is configured to:

determine an optical depth at which the user is looking; and when the optical depth is not greater than the predefined threshold depth, apply the first EDOF correction and the at least one of: defocus blur correction, image sharpening, contrast enhancement, edge enhancement in an alternating manner to the first images and the second images.

In this regard, when the first EDOF correction is applied to a first image, then correspondingly, the at least one of:

defocus blur correction, image sharpening, contrast enhancement, edge enhancement is applied to a second image, and vice versa. Beneficially, in this manner objects at various optical depths are clearly and realistically visible in combined views of the sequence of first images and the sequence of second images (upon applying corrections). This facilitates in providing an immersive and realistic viewing experience to the user. The technical benefit of alternatingly applying the aforementioned operations is that an overall visual quality of the combined views of the aforesaid images would be high (as an overall number of visual artifacts present in these images would be reduced imperceivably upon correction, due to the alternating manner of applying corrections) without a need to consistently apply heavy processing corrections to only one particular sequence of given images for a given eye.

Optionally, the at least one processor is configured to employ a super-resolution technique for a given camera that captured the one of the given first image and the given second image. In this regard, the super-resolution technique is employed in addition to the first EDOF correction.

Optionally, when employing the super-resolution technique, the at least one processor is configured to process a sequence of images (captured by the given camera) in a manner that gaze regions of Q successive output images are generated from a gaze region of each $Q^{th}$ image, wherein the gaze region corresponds to the gaze direction of the user. In other words, every $Q^{th}$ image is used to generate the gaze regions of Q successive output images. It will be appreciated that when the sequence of images is processed in the aforesaid manner, an apparent angular resolution of the gaze regions of the output images is increased by shifting (via a liquid-crystal structure of the display apparatus) a given pixel in the gaze region of each $Q^{th}$ image to Q different positions when displaying Q successive output images. When the user views the Q successive output images, the user is unable to perceive this shifting in light. Instead, the user perceives an extremely high angular resolution (commonly referred to as super-resolution) of the gaze regions of the Q successive output images. In this way, a spatial resolution of the gaze regions of the output images is upsampled within temporal domain.

Additionally, optionally, when employing the super-resolution technique, the at least one processor is configured to process the sequence of images (captured by the given camera) in a manner that a non-gaze region (namely, a remaining region) of a given output image is generated from a corresponding non-gaze region of a corresponding image. Optionally, in this regard, the at least one processor is configured to combine a plurality of pixels in the corresponding non-gaze region of the corresponding image to generate a given pixel in the non-gaze region of the given output image. As a result, an angular resolution of a given gaze region is higher than an angular resolution of a given non-gaze region, while a temporal resolution of the given non-gaze region is higher than a temporal resolution of the given gaze region. Resultantly, no flicker or jerk is noticeable to the user in the non-gaze regions of the output images.

Optionally, in this regard, the display apparatus further comprises a liquid-crystal device per eye, comprising the liquid-crystal structure and a control circuit, wherein the liquid-crystal structure is arranged in front of a surface of a given light source (of the display apparatus), wherein the liquid-crystal structure is to be electrically controlled, via the control circuit, to shift light emanating from a given pixel of the given light source to a plurality of positions in a sequential and repeated manner. The shift in the light emanating from the given pixel to the plurality of positions causes a resolution of the output images to appear higher than a display resolution of the given light source. One such way of employing the super-resolution technique is described, for example, in U.S. Pat. No. 11,056,030B1, titled "DISPLAY APPARATUS AND METHOD OF ENHANCING APPARENT RESOLUTION USING LIQUID-CRYSTAL DEVICE" and filed on Feb. 6, 2020, which has been incorporated herein by reference.

Optionally, the at least one processor is configured to employ the super-resolution technique for another camera that captured the another of the given first image and the given second image. Alternatively, optionally, the at least one processor is configured to employ the super-resolution technique in the gaze region of the another of the given first image and the given second image only, for a given camera that captured the another of the given first image and the given second image. This greatly improves the overall visual quality of the combined view of the given first image and the given second image (when displayed), without a need to employ the super-resolution technique for an entirety of the another of the given first image and the given second image.

The present disclosure also relates to the method as described above. Various embodiments and variants disclosed above, with respect to the aforementioned system, apply mutatis mutandis to the method.

According to an embodiment, the method further comprises:
  obtaining information indicative of a dominant eye of the user or determining the dominant eye from amongst the first eye and the second eye;
  applying the first EDOF correction to the one of the given first image and the given second image by utilising a first neural network that corrects first point spread functions at a focussing distance range of 10 centimetres to M, the first point spread functions correspond to a given camera that captured the one of the given first image and the given second image, M lying in a range of 30 centimetres to 100 centimetres; and
  applying a second EDOF correction to the another of the given first image and the given second image by utilising a second neural network that corrects second point spread functions at a focussing distance range of N to infinity, N lying in a range of 30 centimetres to 100 centimetres, the second point spread functions correspond to another given camera that captured the another of the given first image and the given second image, wherein the another given camera corresponds to the dominant eye of the user.

According to another embodiment, the method further comprises:
  obtaining information indicative of a gaze direction of a given eye;
  identifying a conical region of interest in a given scene of the real-world environment whose axis is the gaze direction;
  determining, based on a depth map of the given scene, optical depths of two or more objects that are present at least partially in the conical region of interest in the given scene at different optical depths;
  determining different focussing steps that correspond to the different optical depths of the two or more objects;
  selecting at least two different neural networks corresponding to the different focussing steps, wherein each of the at least two different neural networks corresponds to at least one focussing step from amongst the different focussing steps;

determining a heaviest neural network from amongst the at least two different neural networks, based on at least one of: a comparison of a number of focussing steps to which each of the at least two different neural networks corresponds individually, a comparison of focussing distance ranges associated with respective focussing steps of the at least two different neural networks;

applying the first EDOF correction to the one of the given first image and the given second image by utilising the heaviest neural network; and applying a second EDOF correction to the another of the given first image and the given second image by utilising another neural network from amongst the at least two different neural networks.

Optionally, the two or more objects comprise at least three objects, and the at least two different neural networks comprise at least three different neural networks, and the method further comprises applying the second EDOF correction and a third EDOF correction in an alternating manner to a given sequence of images corresponding to the another of the given first image and the given second image, wherein the third EDOF correction is applied by utilising yet another neural network from amongst the at least three different neural networks. Optionally, in the method, the another neural network and the yet another neural network correspond to consecutive focussing steps.

Additionally or alternatively, optionally, the two or more objects comprise at least three objects, and the at least two different neural networks comprise at least three different neural networks, and the method further comprises applying the first EDOF correction and a fourth EDOF correction in an alternating manner to a given sequence of images corresponding to the one of the given first image and the given second image, wherein the fourth EDOF correction is applied by utilising still another neural network from amongst the at least three different neural networks that is heavier than the another neural network. Optionally, in the method, the heaviest neural network and the still another neural network correspond to consecutive focussing steps.

Optionally, the method further comprises selecting the another neural network from amongst the at least two different neural networks randomly.

According to yet another embodiment, the method further comprises:
determining, based on a depth map of a given scene of the real-world environment, different optical depths of different objects represented in different parts of the one of the given first image and the given second image;
determining different focussing steps that correspond to the different optical depths of the different objects;
selecting at least two different neural networks corresponding to the different focussing steps, wherein each of the at least two different neural networks corresponds to at least one focussing step from amongst the different focussing steps; and
applying the first EDOF correction to the one of the given first image and the given second image by utilising the at least two different neural networks for respective ones of the different parts of the one of the given first image and the given second image.

According to still another embodiment, the method further comprises:
obtaining information indicative of a dominant eye of the user or determining the dominant eye from amongst the first eye and the second eye;
determining an optical depth at which the user is looking; and
when the optical depth is greater than a predefined threshold depth and a given camera that captured the one of the given first image and the given second image corresponds to the dominant eye of the user, applying the first EDOF correction to the one of the given first image and the given second image.

Optionally, the method comprises:
determining an optical depth at which the user is looking; and
when the optical depth is not greater than the predefined threshold depth, applying the first EDOF correction to any one of the given first image and the given second image randomly.

Alternatively, optionally, the method further comprises:
determining an optical depth at which the user is looking; and
when the optical depth is not greater than the predefined threshold depth, applying the first EDOF correction to the sequence of first images.

Yet alternatively, optionally, the method further comprises:
determining an optical depth at which the user is looking; and
when the optical depth is not greater than the predefined threshold depth, applying the first EDOF correction and the at least one of: defocus blur correction, image sharpening, contrast enhancement, edge enhancement in an alternating manner to the first images and the second images.

Optionally, the method further comprises employing a super-resolution technique for a given camera that captured the one of the given first image and the given second image.

Optionally, in the method, a camera lens of a given camera that captured the one of the given first image and the given second image comprises a phase mask or an amplitude mask.

DETAILED DESCRIPTION OF THE DRAWINGS

Figure 1B:
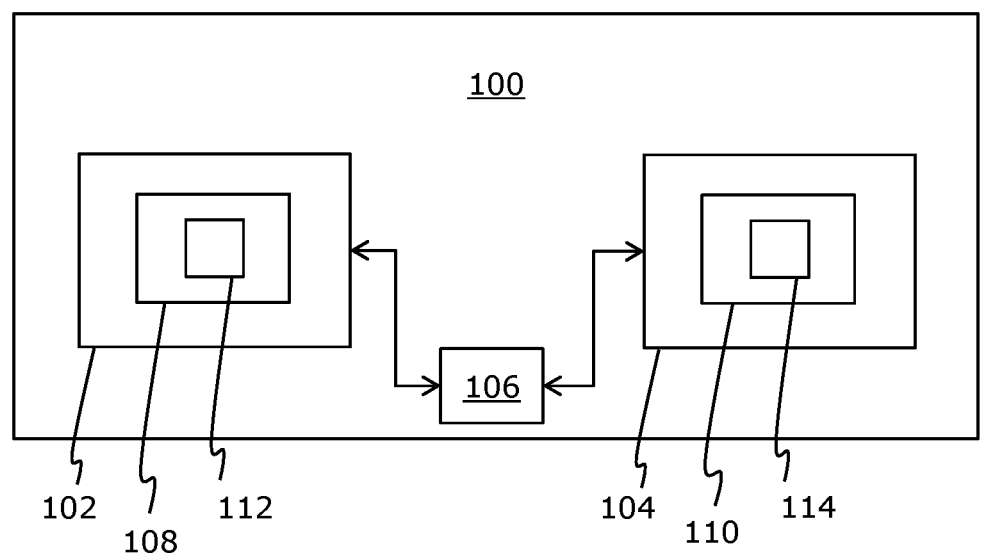

Referring to FIGS. 1A and 1B, there are shown illustrations of block diagrams of architectures of an imaging system 100, in accordance with different embodiments of the present disclosure. In both FIGS. 1A and 1B, the imaging system 100 comprises a first camera 102, a second camera 104 and at least one processor (depicted as a processor 106). The first camera 102 and the second camera 104 correspond to a first eye and a second eye of a user, respectively. The first camera 102 and the second camera 104 are communicably coupled to the at least one processor 106. In FIG. 1B, the imaging system 100 further comprises a camera lens 108 of the first camera 102 and a camera lens 110 of the second camera 104. The camera lenses 108 and 110 comprise masks 112 and 114, respectively. The masks 112 and 114 may either be a phase mask or an amplitude mask.

It may be understood by a person skilled in the art that FIG. 1A and FIG. 1B include simplified architectures of the imaging system 100, for sake of clarity, which should not unduly limit the scope of the claims herein. It is to be understood that the specific implementations of the imaging system 100 are provided as examples and are not to be construed as limiting it to specific numbers or types of cameras or to specific numbers or types of camera lenses. The person skilled in the art will recognize many variations, alternatives, and modifications of embodiments of the present disclosure.

Figure 2:
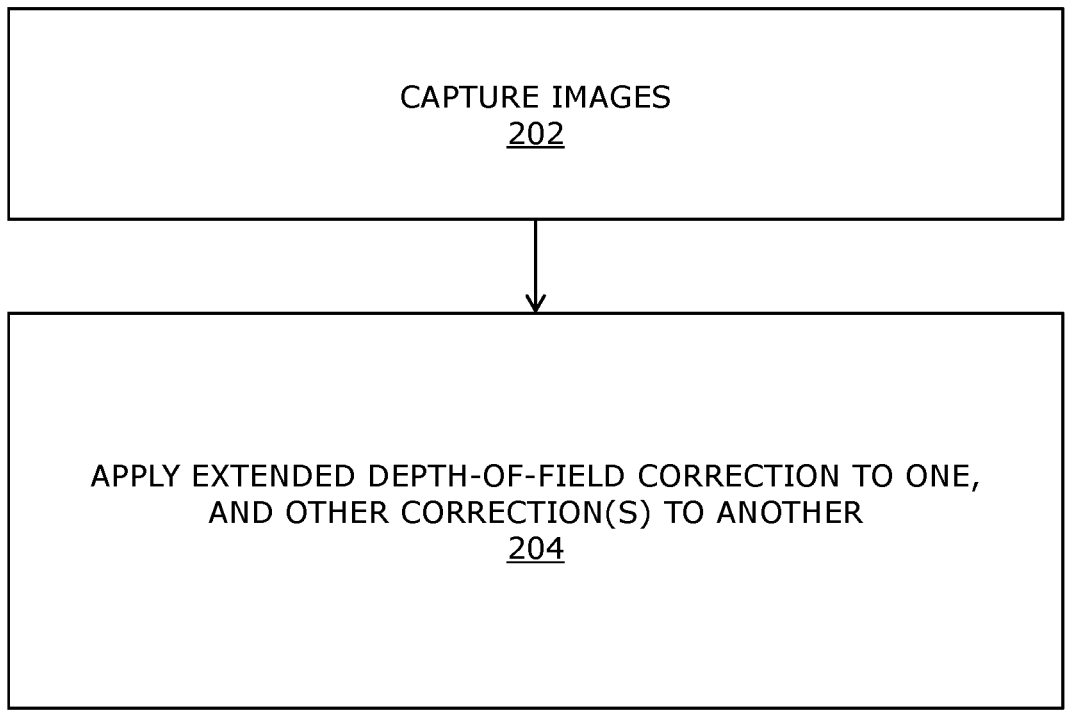
FIG. 2 illustrates steps of a method incorporating selective extended depth-of-field correction, in accordance with an embodiment of the present disclosure.

Referring to FIG. 2, illustrated are steps of a method incorporating selective EDOF correction, in accordance with an embodiment of the present disclosure. At step 202, a first camera and a second camera are controlled to capture a sequence of first images and a sequence of second images of a real-world environment, respectively. The first camera and the second camera correspond to a first eye and a second eye of a user, respectively. At step 204, a first EDOF correction is applied to one of a given first image and a given second image, whilst at least one of: defocus blur correction, image sharpening, contrast enhancement, edge enhancement, is applied to another of the given first image and the given second image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
   a first camera and a second camera corresponding to a first eye and a second eye of a user, respectively; and
   at least one processor configured to:
   control the first camera and the second camera to capture a sequence of first images and a sequence of second images of a real-world environment, respectively;
   obtain information indicative of a gaze direction of a given eye;
   identify a conical region of interest in a given scene of the real-world environment whose axis is the gaze direction;
   determine, based on a depth map of the given scene, optical depths of two or more objects that are present at least partially in the conical region of interest in the given scene at different optical depths;
   determine different focussing steps that correspond to the different optical depths of the two or more objects;
   select at least two different neural networks corresponding to the different focussing steps, wherein each of the at least two different neural networks corresponds to at least one focussing step from amongst the different focussing steps;
   determine a heaviest neural network from amongst the at least two different neural networks, based on at least one of: a comparison of a number of focussing steps to which each of the at least two different neural networks corresponds individually, a comparison of focussing distance ranges associated with respective focussing steps of the at least two different neural networks;
   apply a first extended depth-of-field correction to one of a given first image and a given second image by utilising the heaviest neural network, whilst applying at least one of: defocus blur correction, image sharpening, contrast enhancement, edge enhancement to another of the given first image and the given second image; and
   apply a second extended depth-of-field correction to the another of the given first image and the given second image by utilising another neural network from amongst the at least two different neural networks.

2. The imaging system of claim 1, wherein the at least one processor is configured to:
   obtain information indicative of a dominant eye of the user or determine the dominant eye from amongst the first eye and the second eye;
   apply the first extended depth-of-field correction to the one of the given first image and the given second image by utilising a first neural network that corrects first point spread functions at a focussing distance range of 10 centimetres to M, the first point spread functions correspond to a given camera that captured the one of the given first image and the given second image, M lying in a range of 30 centimetres to 100 centimetres; and
   apply a second extended depth-of-field correction to the another of the given first image and the given second image by utilising a second neural network that corrects second point spread functions at a focussing distance range of N to infinity, N lying in a range of 30 centimetres to 100 centimetres, the second point spread functions correspond to another given camera that captured the another of the given first image and the given second image, wherein the another given camera corresponds to the dominant eye of the user.

3. The imaging system of claim 1, wherein the two or more objects comprise at least three objects, and the at least two different neural networks comprise at least three different neural networks, and the at least one processor is configured to apply the second extended depth-of-field correction and a third extended depth-of field correction in an alternating manner to a given sequence of images corresponding to the another of the given first image and the given second image, wherein the third extended depth-of-field correction is applied by utilising yet another neural network from amongst the at least three different neural networks.

4. The imaging system of claim 3, wherein the another neural network and the yet another neural network correspond to consecutive focussing steps.

5. The imaging system of claim 1, wherein the two or more objects comprise at least three objects, and the at least two different neural networks comprise at least three different neural networks, and the at least one processor is configured to apply the first extended depth-of-field correction and a fourth extended depth-of field correction in an alternating manner to a given sequence of images corresponding to the one of the given first image and the given second image, wherein the fourth extended depth-of-field correction is applied by utilising still another neural network from amongst the at least three different neural networks that is heavier than the another neural network.

6. The imaging system of claim 5, wherein the heaviest neural network and the still another neural network correspond to consecutive focussing steps.

7. The imaging system of claim 1, wherein the at least one processor is configured to select the another neural network from amongst the at least two different neural networks randomly.

8. The imaging system of claim 1, wherein the at least one processor is configured to:
   determine, based on a depth map of a given scene of the real-world environment, different optical depths of different objects represented in different parts of the one of the given first image and the given second image;

determine different focussing steps that correspond to the different optical depths of the different objects;

select at least two different neural networks corresponding to the different focussing steps, wherein each of the at least two different neural networks corresponds to at least one focussing step from amongst the different focussing steps; and apply the first extended depth-of-field correction to the one of the given first image and the given second image by utilising the at least two different neural networks for respective ones of the different parts of the one of the given first image and the given second image.

9. The imaging system of claim 1, wherein the at least one processor is configured to:

obtain information indicative of a dominant eye of the user or determine the dominant eye from amongst the first eye and the second eye;

determine an optical depth at which the user is looking; and when the optical depth is greater than a predefined threshold depth and a given camera that captured the one of the given first image and the given second image corresponds to the dominant eye of the user, apply the first extended depth-of-field correction to the one of the given first image and the given second image.

10. The imaging system of claim 1, wherein the at least one processor is configured to:

determine an optical depth at which the user is looking; and when the optical depth is not greater than a predefined threshold depth, apply the first extended depth-of field correction to any one of the given first image and the given second image randomly.

11. The imaging system of claim 1, wherein the at least one processor is configured to:

determine an optical depth at which the user is looking; and when the optical depth is not greater than a predefined threshold depth, apply the first extended depth-of field correction to the sequence of first images.

12. The imaging system of claim 1, wherein the at least one processor is configured to:

determine an optical depth at which the user is looking; and when the optical depth is not greater than a predefined threshold depth, apply the first extended depth-of field correction and the at least one of: defocus blur correction, image sharpening, contrast enhancement, edge enhancement in an alternating manner to the first images and the second images.

13. The imaging system of claim 1, wherein the at least one processor is configured to employ a super-resolution technique for a given camera that captured the one of the given first image and the given second image.

14. The imaging system of claim 1, wherein a camera lens of a given camera that captured the one of the given first image and the given second image comprises a phase mask or an amplitude mask.

15. A method comprising:

controlling a first camera and a second camera to capture a sequence of first images and a sequence of second images of a real-world environment, respectively, wherein the first camera and the second camera correspond to a first eye and a second eye of a user, respectively;

obtaining information indicative of a gaze direction of a given eye;

identifying a conical region of interest in a given scene of the real-world environment whose axis is the gaze direction;

determining, based on a depth map of the given scene, optical depths of two or more objects that are present at least partially in the conical region of interest in the given scene at different optical depths;

determining different focussing steps that correspond to the different optical depths of the two or more objects;

selecting at least two different neural networks corresponding to the different focussing steps, wherein each of the at least two different neural networks corresponds to at least one focussing step from amongst the different focussing steps;

determining a heaviest neural network from amongst the at least two different neural networks, based on at least one of: a comparison of a number of focussing steps to which each of the at least two different neural networks corresponds individually, a comparison of focussing distance ranges associated with respective focussing steps of the at least two different neural networks;

applying a first extended depth-of-field correction to one of a given first image and a given second image by utilising the heaviest neural network, whilst applying at least one of: defocus blur correction, image sharpening, contrast enhancement, edge enhancement to another of the given first image and the given second image; and applying a second extended depth-of-field correction to the another of the given first image and the given second image by utilising another neural network from amongst the at least two different neural networks.

16. The method of claim 15, further comprising:

obtaining information indicative of a dominant eye of the user or determining the dominant eye from amongst the first eye and the second eye;

applying the first extended depth-of-field correction to the one of the given first image and the given second image by utilising a first neural network that corrects first point spread functions at a focussing distance range of 10 centimetres to M, the first point spread functions correspond to a given camera that captured the one of the given first image and the given second image, M lying in a range of 30 centimetres to 100 centimetres; and applying a second extended depth-of-field correction to the another of the given first image and the given second image by utilising a second neural network that corrects second point spread functions at a focussing distance range of N to infinity, N lying in a range of 30 centimetres to 100 centimetres, the second point spread functions correspond to another given camera that captured the another of the given first image and the given second image, wherein the another given camera corresponds to the dominant eye of the user.

17. The method of claim 15, wherein the two or more objects comprise at least three objects, and the at least two different neural networks comprise at least three different neural networks, and the method further comprises applying the second extended depth-of-field correction and a third extended depth-of field correction in an alternating manner to a given sequence of images corresponding to the another of the given first image and the given second image, wherein the third extended depth-of-field correction is applied by utilising yet another neural network from amongst the at least three different neural networks.

18. The method of claim 17, wherein the another neural network and the yet another neural network correspond to consecutive focussing steps.

19. The method of claim 15, wherein the two or more objects comprise at least three objects, and the at least two different neural networks comprise at least three different neural networks, and the method further comprises applying the first extended depth-of-field correction and a fourth extended depth-of field correction in an alternating manner to a given sequence of images corresponding to the one of the given first image and the given second image, wherein the fourth extended depth-of-field correction is applied by utilising still another neural network from amongst the at least three different neural networks that is heavier than the another neural network.

20. The method of claim 19, wherein the heaviest neural network and the still another neural network correspond to consecutive focussing steps.

21. The method of claim 15, further comprising selecting the another neural network from amongst the at least two different neural networks randomly.

22. The method of claim 15, further comprising:
determining, based on a depth map of a given scene of the real-world environment, different optical depths of different objects represented in different parts of the one of the given first image and the given second image;
determining different focussing steps that correspond to the different optical depths of the different objects;
selecting at least two different neural networks corresponding to the different focussing steps, wherein each of the at least two different neural networks corresponds to at least one focussing step from amongst the different focussing steps; and
applying the first extended depth-of-field correction to the one of the given first image and the given second image by utilising the at least two different neural networks for respective ones of the different parts of the one of the given first image and the given second image.

23. The method of claim 15, further comprising:
obtaining information indicative of a dominant eye of the user or determining the dominant eye from amongst the first eye and the second eye;
determining an optical depth at which the user is looking; and
when the optical depth is greater than a predefined threshold depth and a given camera that captured the one of the given first image and the given second image corresponds to the dominant eye of the user, applying the first extended depth-of field correction to the one of the given first image and the given second image.

24. The method of claim 15, further comprising:
determining an optical depth at which the user is looking; and
when the optical depth is not greater than a predefined threshold depth, applying the first extended depth-of field correction to any one of the given first image and the given second image randomly.

25. The method of claim 15, further comprising:
determining an optical depth at which the user is looking; and
when the optical depth is not greater than a predefined threshold depth, applying the first extended depth-of field correction to the sequence of first images.

26. The method of claim 15, further comprising:
determining an optical depth at which the user is looking; and
when the optical depth is not greater than a predefined threshold depth, applying the first extended depth-of field correction and the at least one of: defocus blur correction, image sharpening, contrast enhancement, edge enhancement in an alternating manner to the first images and the second images.

27. The method of claim 15, further comprising employing a super-resolution technique for a given camera that captured the one of the given first image and the given second image.

28. The method of claim 15, wherein a camera lens of a given camera that captured the one of the given first image and the given second image comprises a phase mask or an amplitude mask.

* * * * *